(12) United States Patent
Komulainen et al.

(10) Patent No.: US 12,445,876 B2
(45) Date of Patent: Oct. 14, 2025

(54) METHOD, APPARATUS AND COMPUTER PROGRAM

(71) Applicant: Nokia Technologies Oy, Espoo (FI)

(72) Inventors: Mikko Komulainen, Oulu (FI); Ronny Peeters, Hoboken (BE)

(73) Assignee: Nokia Technologies Oy, Espoo (FI)

( * ) Notice: Subject to any disclaimer, the term of this patent is extended or adjusted under 35 U.S.C. 154(b) by 361 days.

(21) Appl. No.: 18/183,553

(22) Filed: Mar. 14, 2023

(65) Prior Publication Data

US 2023/0292161 A1 Sep. 14, 2023

(30) Foreign Application Priority Data

Mar. 14, 2022 (EP) ..................................... 22161860

(51) Int. Cl.
*H04W 24/08* (2009.01)
*H04B 7/0404* (2017.01)
*H04W 60/00* (2009.01)

(52) U.S. Cl.
CPC .......... *H04W 24/08* (2013.01); *H04B 7/0404* (2013.01); *H04W 60/00* (2013.01)

(58) Field of Classification Search
CPC .... H04W 24/08; H04W 60/00; H04B 7/0404; H04B 7/0811; H04B 7/0608; H04B 7/0691; H04B 17/382; H04B 17/318
See application file for complete search history.

(56) References Cited

U.S. PATENT DOCUMENTS

| | | |
|---|---|---|
| 9,742,481 B1 | 8/2017 | Jorgovanovic et al. |
| 2012/0264473 A1* | 10/2012 | Mujtaba ............... H04B 7/0602 455/515 |
| 2013/0308608 A1* | 11/2013 | Hu ....................... H04W 72/542 370/334 |
| 2016/0127006 A1 | 5/2016 | Majjigi et al. |
| 2019/0097714 A1 | 3/2019 | Ash, Jr. et al. |
| 2021/0314055 A1* | 10/2021 | Meshkati ............. H04B 7/0617 |

FOREIGN PATENT DOCUMENTS

WO 2015/187291 A1 12/2015
WO 2018/126247 A2 7/2018

OTHER PUBLICATIONS

Jia et al., "Omnidirectional Solid Angle Beam-Switching Flexible Array Antenna in Millimeter Wave for 5G Micro Base Station Applications", IEEE Access, vol. 7, Oct. 9, 2019, pp. 157027-157036.
Extended European Search Report received for corresponding European Patent Application No. 22161860.6, dated Sep. 12, 2022, 8 pages.
Office action received for corresponding European Patent Application No. 22161860.6, dated Apr. 10, 2025, 6 pages.

* cited by examiner

*Primary Examiner* — Hashim S Bhatti
(74) *Attorney, Agent, or Firm* — Nokia Technologies Oy

(57) ABSTRACT

There is provided an apparatus, said apparatus comprising means for, when the apparatus is in idle mode, determining signal measurements for at least two antenna configurations of the apparatus, determining, based on the signal measurements, one of the at least two antenna configurations and performing a network attach procedure using the determined antenna configuration.

20 Claims, 22 Drawing Sheets

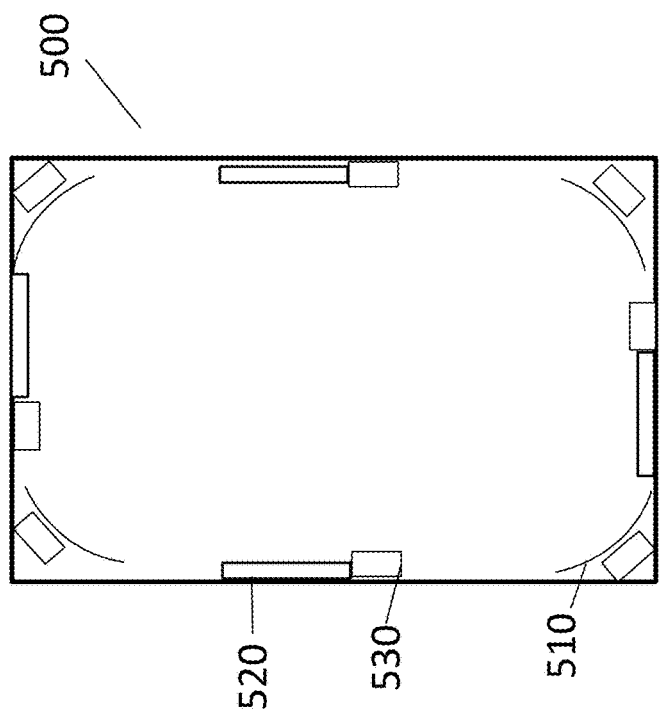
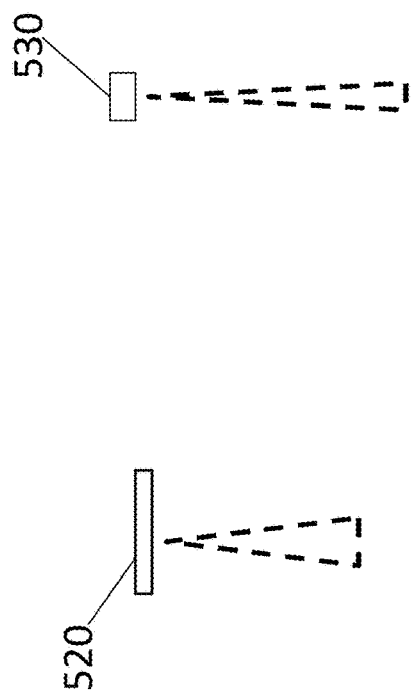
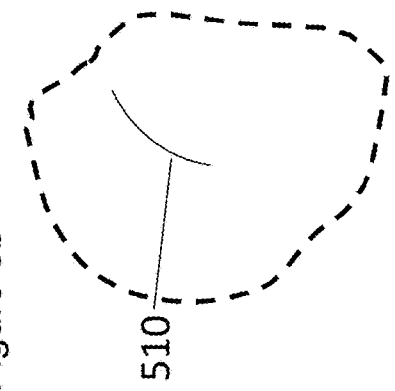
Figure 5a
Figure 5b

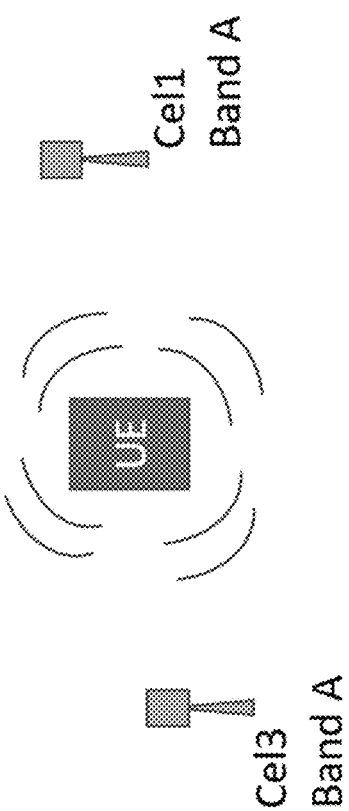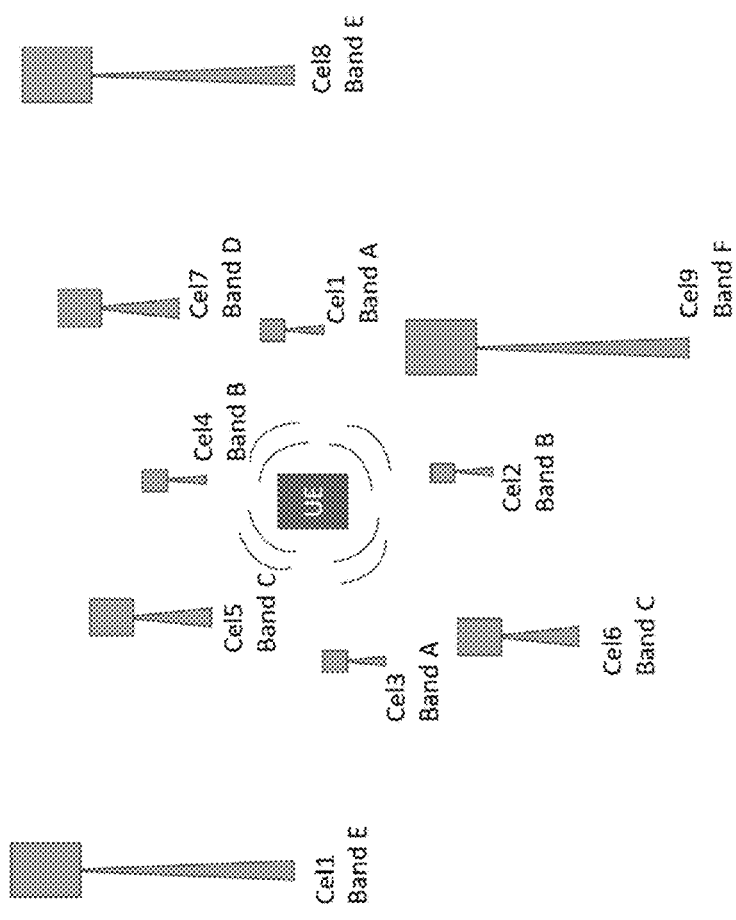

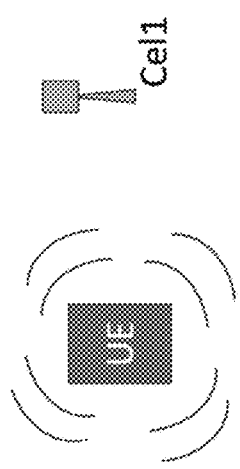
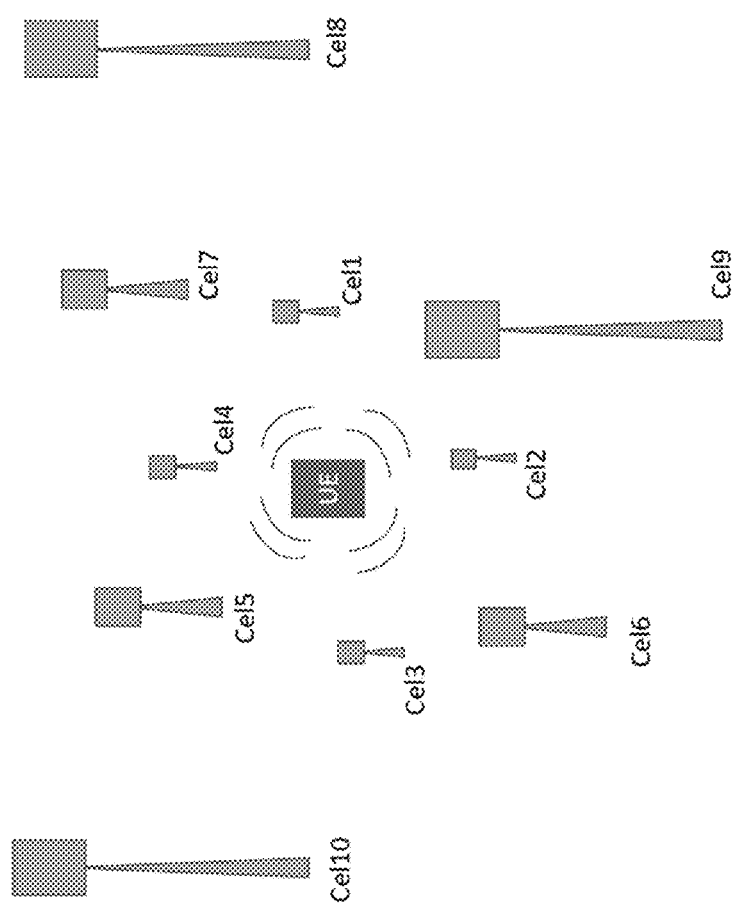
Figure 22a
Figure 22b

METHOD, APPARATUS AND COMPUTER PROGRAM

RELATED APPLICATION

This application claims priority to the European Patent Application 22161860.6, filed on Mar. 14, 2022, the content of which is incorporated herein by reference in its entirety.

FIELD

The present application relates to a method, apparatus, system and computer program and in particular but not exclusively to antenna and radio arrangements for a user equipment.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (for example for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology (NG-RAN). 5GS including NR are being standardized by the 3rd Generation Partnership Project (3GPP).

SUMMARY

In a first aspect there is provided an apparatus, said apparatus comprising means for an apparatus, said apparatus comprising means for, when the apparatus is in idle mode, determining signal measurements for at least two antenna configurations of the apparatus, determining, based on the signal measurements, one of the at least two antenna configurations and performing a network attach procedure using the determined antenna configuration.

The apparatus may comprise means for holding the apparatus in idle mode while the antenna configuration is determined.

The apparatus may comprise means for, on initial activation of the apparatus or after a given time period, determining signal measurements for at least two antenna configurations, determining, based on the signal measurements, one of the at least two antenna configurations and performing the network attach procedure using the determined antenna configuration The apparatus may comprise means for, when the apparatus is in connected mode, determining signal measurements for at least two antenna configurations, determining, based on the signal measurements, one of the at least two antenna configurations and using the determined antenna configuration for at least one of transmission and reception.

The apparatus may comprise means for when the device is in connected mode and after a given time period or based on a signal measurement threshold, determining signal measurements for the at least two antenna configurations, determining, based on the signal measurements, one of the at least two antenna configurations and using the determined antenna configuration for at least one of transmission and reception.

The apparatus may comprise means for determining the signal measurements for the at least two antenna configurations for at least one first radio access technology while at least one second radio access technology is disabled.

The apparatus may comprise means for determining the at least one first radio access technology based on radio access technology priority information.

The apparatus may comprise means for determining the signal measurements for the at least two antenna configurations for at least one first band while measurements for at least one second band are disabled.

The apparatus may comprise means for determining the at least one first band based on band priority information.

The apparatus may comprise means for determining the signal measurements for the at least two antenna configurations for at least at least one first cell while measurements for at least one second cell are disabled.

The apparatus may comprise means for determining the at least one first cell based on cell priority information.

The signal measurements may comprise at least one of signal strength and signal quality.

In a second aspect, there is provided a method comprising, for an apparatus in idle mode, determining signal measurements for at least two antenna configurations of the apparatus, determining, based on the signal measurements, one of the at least two antenna configurations and performing a network attach procedure using the determined antenna configuration.

The method may comprise holding the apparatus in idle mode while the antenna configuration is determined.

The method may comprise, on initial activation of the apparatus or after a given time period, determining signal measurements for at least two antenna configurations, determining, based on the signal measurements, one of the at least two antenna configurations and performing the network attach procedure using the determined antenna configuration The method may comprise, when the apparatus is in connected mode, determining signal measurements for at least two antenna configurations, determining, based on the signal measurements, one of the at least two antenna configurations and using the determined antenna configuration for at least one of transmission and reception.

The method may comprise when the device is in connected mode and after a given time period or based on a signal measurement threshold, determining signal measurements for the at least two antenna configurations, determining, based on the signal measurements, one of the at least two antenna configurations and using the determined antenna configuration for at least one of transmission and reception.

The method may comprise determining the signal measurements for the at least two antenna configurations for at least one first radio access technology while at least one second radio access technology is disabled.

The method may comprise determining the at least one first radio access technology based on radio access technology priority information.

The method may comprise determining the signal measurements for the at least two antenna configurations for at least one first band while measurements for at least one second band are disabled.

The method may comprise determining the at least one first band based on band priority information.

The method may comprise determining the signal measurements for the at least two antenna configurations for at least at least one first cell while measurements for at least one second cell are disabled.

The method may comprise determining the at least one first cell based on cell priority information.

The signal measurements may comprise at least one of signal strength and signal quality.

In a third aspect there is provided an apparatus comprising: at least one processor and at least one memory including a computer program code, the at least one memory and computer program code configured to, with the at least one processor, cause the apparatus at least to, when the apparatus is in idle mode, determine signal measurements for at least two antenna configurations of the apparatus, determine, based on the signal measurements, one of the at least two antenna configurations and perform a network attach procedure using the determined antenna configuration.

The apparatus may be configured to hold the apparatus in idle mode while the antenna configuration is determined.

The apparatus may be configured to, on initial activation of the apparatus or after a given time period, determine signal measurements for at least two antenna configurations, determine, based on the signal measurements, one of the at least two antenna configurations and perform the network attach procedure using the determined antenna configuration The apparatus may be configured to, when the apparatus is in connected mode, determine signal measurements for at least two antenna configurations, determine, based on the signal measurements, one of the at least two antenna configurations and use the determined antenna configuration for at least one of transmission and reception.

The apparatus may be configured to, when the device is in connected mode and after a given time period or based on a signal measurement threshold, determine signal measurements for the at least two antenna configurations, determine, based on the signal measurements, one of the at least two antenna configurations and use the determined antenna configuration for at least one of transmission and reception.

The apparatus may be configured to determine the signal measurements for the at least two antenna configurations for at least one first radio access technology while at least one second radio access technology is disabled.

The apparatus may be configured to determine the at least one first radio access technology based on radio access technology priority information.

The apparatus may be configured to determine the signal measurements for the at least two antenna configurations for at least one first band while measurements for at least one second band are disabled.

The apparatus may be configured to determine the at least one first band based on band priority information.

The apparatus may be configured to determine the signal measurements for the at least two antenna configurations for at least at least one first cell while measurements for at least one second cell are disabled.

The apparatus may be configured to determine the at least one first cell based on cell priority information.

The signal measurements may comprise at least one of signal strength and signal quality.

In a fourth aspect there is provided a computer readable medium comprising program instructions for causing an apparatus to perform at least the following when the apparatus is in idle mode, determining signal measurements for at least two antenna configurations of the apparatus, determining, based on the signal measurements, one of the at least two antenna configurations and performing a network attach procedure using the determined antenna configuration.

The apparatus may be caused to perform holding the apparatus in idle mode while the antenna configuration is determined.

The apparatus may be caused to perform, on initial activation of the apparatus or after a given time period, determining signal measurements for at least two antenna configurations, determining, based on the signal measurements, one of the at least two antenna configurations and performing the network attach procedure using the determined antenna configuration The apparatus may be caused to perform, when the apparatus is in connected mode, determining signal measurements for at least two antenna configurations, determining, based on the signal measurements, one of the at least two antenna configurations and using the determined antenna configuration for at least one of transmission and reception.

The apparatus may be caused to perform, when the device is in connected mode and after a given time period or based on a signal measurement threshold, determining signal measurements for the at least two antenna configurations, determining, based on the signal measurements, one of the at least two antenna configurations and using the determined antenna configuration for at least one of transmission and reception.

The apparatus may be caused to perform determining the signal measurements for the at least two antenna configurations for at least one first radio access technology while at least one second radio access technology is disabled.

The apparatus may be caused to perform determining the at least one first radio access technology based on radio access technology priority information.

The apparatus may be caused to perform determining the signal measurements for the at least two antenna configurations for at least one first band while measurements for at least one second band are disabled.

The apparatus may be caused to perform determining the at least one first band based on band priority information.

The apparatus may be caused to perform determining the signal measurements for the at least two antenna configurations for at least at least one first cell while measurements for at least one second cell are disabled.

The apparatus may be caused to perform determining the at least one first cell based on cell priority information.

The signal measurements may comprise at least one of signal strength and signal quality.

In a fifth aspect there is provided an electronics communication device comprising the apparatus of the first aspect.

In a sixth aspect there is provided a non-transitory computer readable medium comprising program instructions for causing an apparatus to perform at least the method according to the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5a shows a schematic diagram of antenna implementation in an example user equipment;

FIG. 5b shows an example radiation pattern of a first, second and third antenna;

FIG. 7b shows an example radiation pattern of the antenna array of FIG. 7a;

FIG. 20a shows a schematic diagram of an example UE in a communication system with cells having different bands;

FIG. 20b shows a schematic diagram of an example UE locked to a first band;

FIG. 22a shows a schematic diagram of a UE in a communication system comprising cells 1 to 10;

FIG. 22b shows a schematic diagram of an example UE locked to a first cell.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for example QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
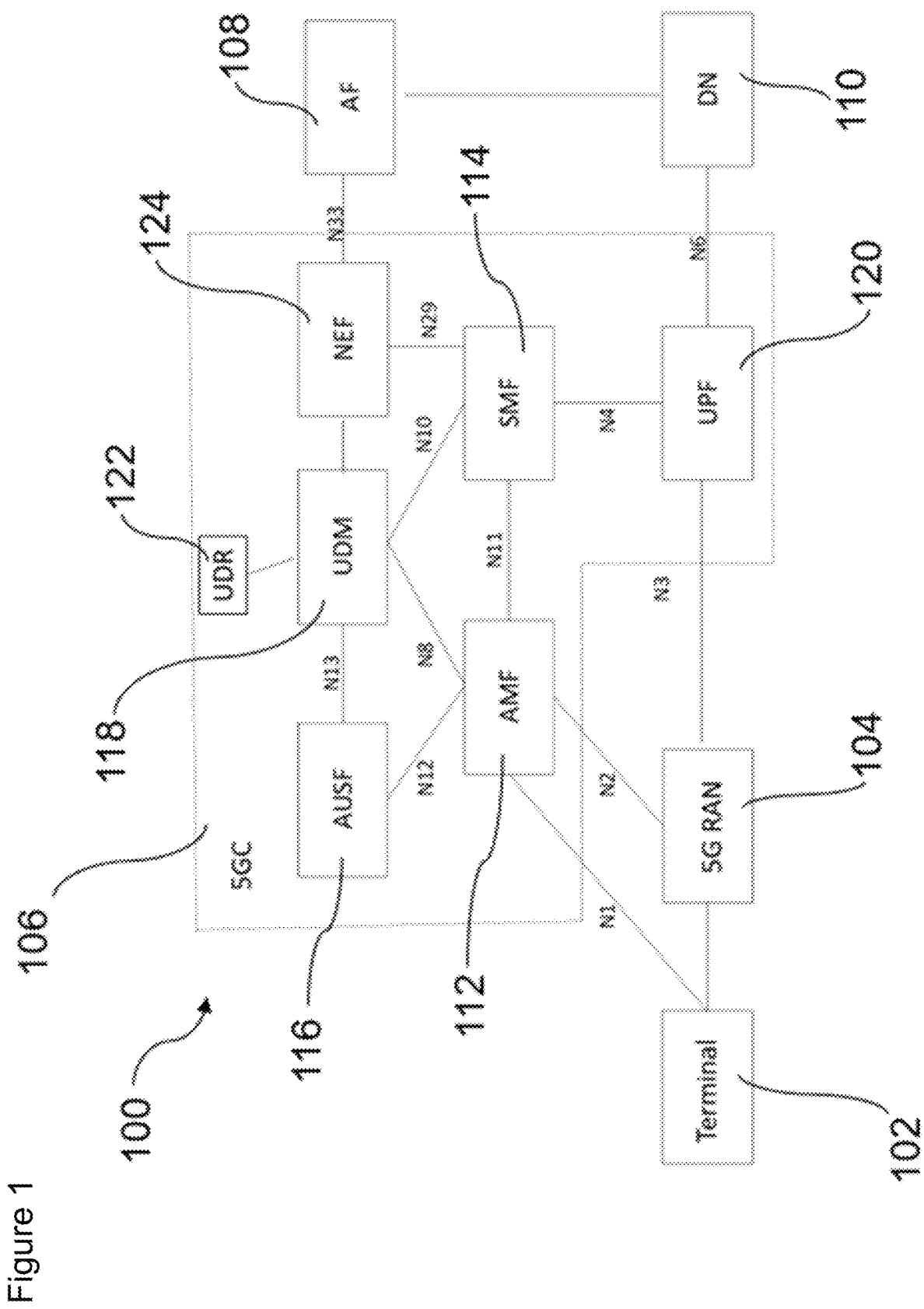
FIG. 1 shows a schematic diagram of an example communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a terminal device via the radio access network (RAN). The 5GRAN may comprise one or more gNodeB (GNB) distributed unit functions connected to one or more gNodeB (GNB) centralized unit functions. The RAN may comprise one or more access nodes.

A UPF (User Plane Function) whose role is called PSA (Protocol Data Unit (PDU) Session Anchor) may be responsible for forwarding frames back and forth between the DN (data network) and the tunnels established over the 5G towards the UE(s) exchanging traffic with the DN.

Figure 2:
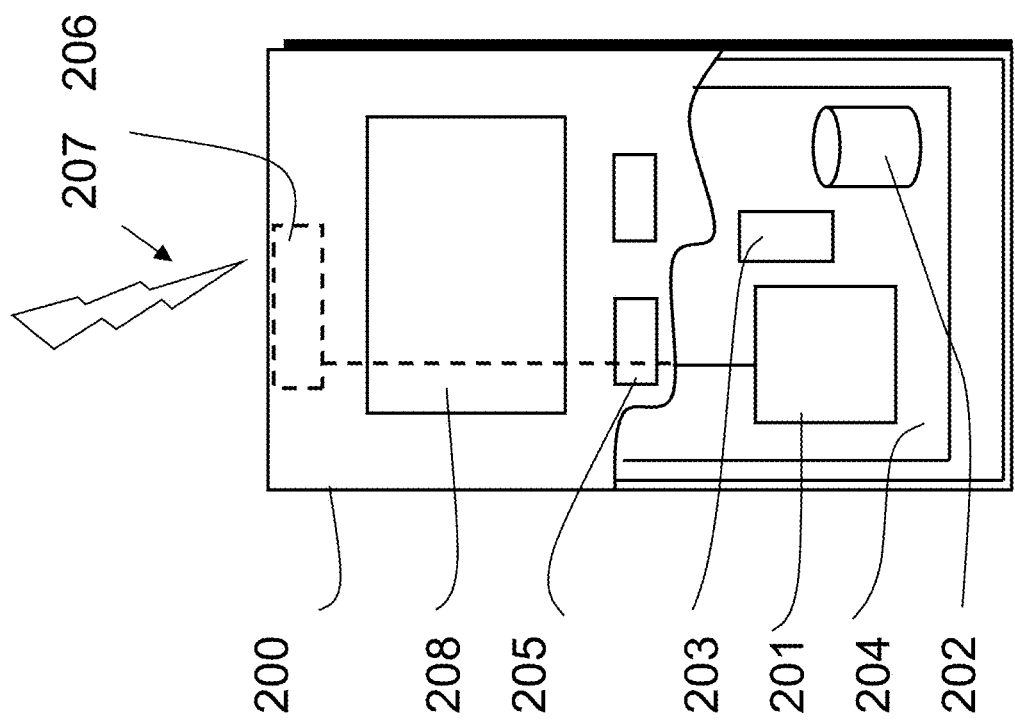
FIG. 2 shows a schematic diagram of an example mobile communication device.

A possible terminal device will now be described in more detail with reference to FIG. 2 showing a schematic, partially sectioned view of a communication device 200. Such a communication device is often referred to as user equipment (UE). An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (for example, USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface, and not limited to, such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The device 200 may receive (RX) signals over an air or radio interface 207 via appropriate apparatus for receiving and may transmit (TX) signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
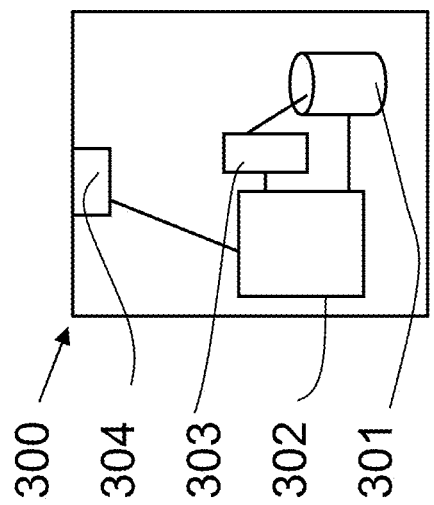
FIG. 3 shows a schematic diagram of an example control apparatus.

FIG. 3 shows an example embodiment of a control apparatus for a communication system, for example to be coupled to and/or for controlling a station of an access system, such as a RAN node, for example a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The ever-increasing appetite for wireless data transfer has led to almost full usage of radio spectrum at the sub-6 GHz frequencies. 5G and 6G wireless communication looks to use spectrum from higher frequencies. 5G implements mm-wave spectrum at 24.25-29.50 GHz (n257, n258, n261) and 37-43.50 GHz (n259, n260). 47.2-48.2 (n262) is also standardized in 3GPP. In the future, 60 GHz, 100 GHz and THz frequency ranges at least are subject to research for commercial implementation in the 6G 3GPP radio access.

An inherent characteristic of radio wave propagation is the higher the operating frequency, the higher the radio signal propagation attenuation. For any practical Radio Access Network (RAN) implementation at high frequencies, macro Base Station (BTS)-sites with kilometre ranges may not be feasible. The new mm-wave/THz range access technology may be increasingly localized and brought closer to end-users.

Figure 4:
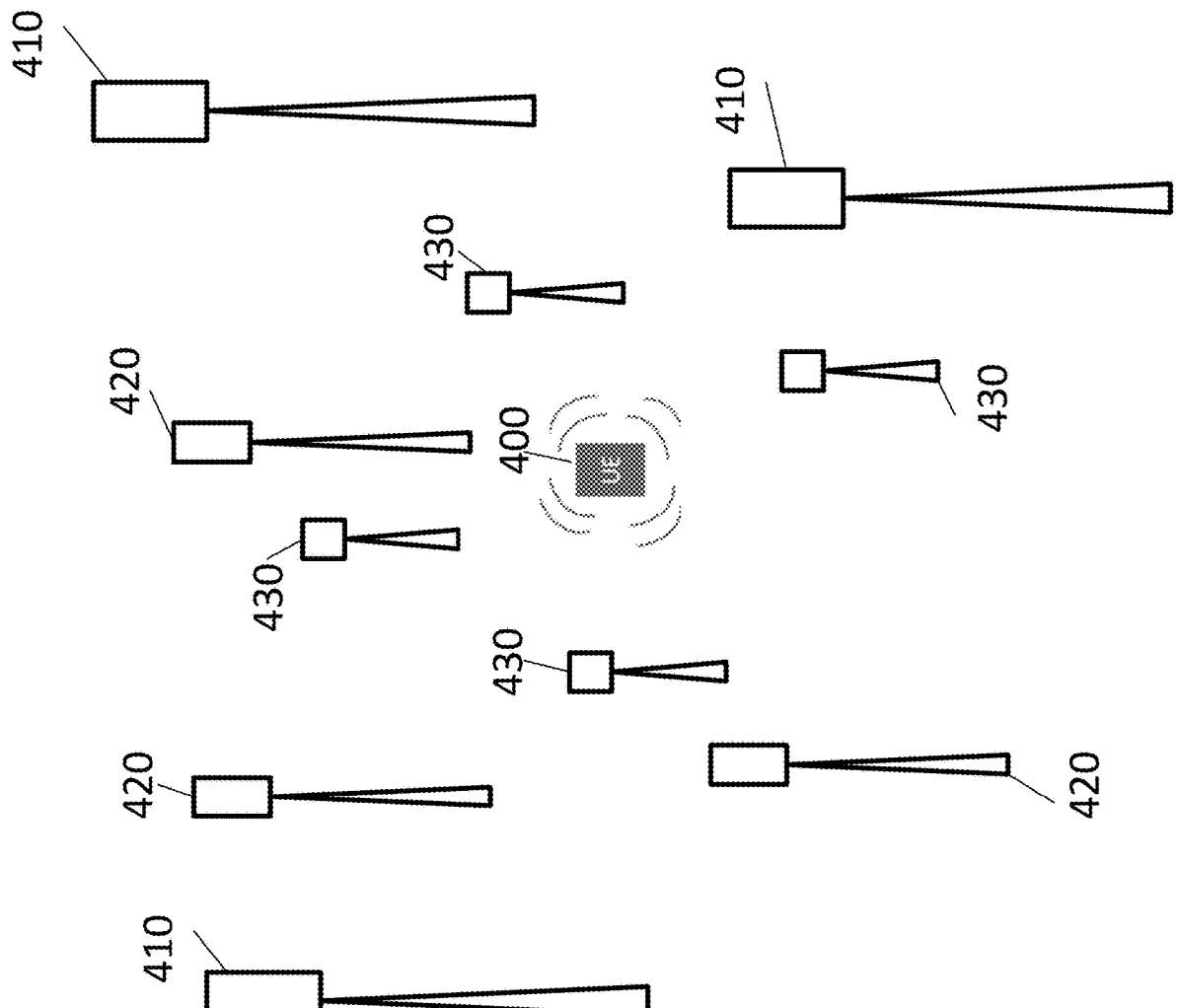
FIG. 4 shows a schematic diagram of an example RAN deployment model.

A possible scenario for a future RAN deployment model is illustrated in FIG. 4. In this scenario sub-6 GHz range uses traditional macro-site implementation with base stations 410 to provide the coverage. Sub-6 GHz is complemented with lower mm-wave range small cells 420 which may be located at, for example, streets in front of buildings and indoor densely populated areas. Upper mm-wave and THz spectrum may be deployed using localized femto/pico cells 430, for example, located indoors. Due to the nature of short range femto/pico cells 430, a possible future application for THz pico/femto cell 430 may be, for example, an office room, office cubicles or tables at a cafeteria of a highly localized spot.

A likely deployment model, as illustrated in FIG. 4 for example, is to use the sub-6 GHz (perhaps sub-10 GHz) for coverage and the higher frequency spectrum locally for capacity and/or to off-load users from the sub-6 GHz spectrum. This deployment model may result in an increase in the number of different Radio Access Technologies (RAT), radio frequency bands and RAN cells in which a UE 400 can operate.

An increase in frequencies used in a UE may involve implementing and integrating more antennas and radios in a device. An example of possible future antenna implementation in a portable UE 500 is shown in FIG. 5a. The example UE 500 in FIG. 5a includes sub-6 GHz antennas 510 with an omni-directional radiation pattern, lower frequency mm-wave antennas 520 with a directive radiation pattern and higher frequency mm-wave/THz antennas 530 with a more directive radiation pattern than the lower frequency mm-wave antenna. FIG. 5b illustrates an example of the radiation pattern shape for each of antennas 510, 520 and 530.

Antenna dimensions scale with wavelength. The higher the operating frequency, the larger antenna array or more directive antenna structure providing higher gain may be implemented for a fixed antenna volume and price.

The higher the operating frequency, the higher the Radio Frequency (RF) signal attenuation, and higher UE (and RAN) antenna gain is required for fixed range and service coverage.

The higher the operating frequency and the antenna gain is, the more antennas for more directions are required in a UE.

Increasing the maximum allowed RF transmit power in portable battery-operated devices (UEs) may not be an efficient means to increase the coverage because of increased power consumption and the fact that the devices are used in proximity to a human body with the RF emission subject to increasingly stringent safety regulations.

A greater number of, and more complex, antenna selection procedures will be applied in a device. Managing interoperability between different antenna selection procedures becomes more complex.

Since the early 2000s, smartphone antenna constellations have included proprietary (non-standardized) antenna switching/selection procedures implemented by original equipment manufacturers (OEM). In addition to smartphones and tablet computers, antenna switching/selection implementations are used in other types of 3GPP access UEs.

The following example implementation of a proprietary antenna switching/selection procedure is described in the context of indoor Fixed Wireless Access (FWA) Customer Premises Equipment (CPE).

A FWA CPE device 600 and its high gain omni-directional antenna implementation are presented in FIGS. 6 to 10. An objective of this illustrated antenna implementation is to provide high gain (~11 dBi) overall antenna radiation pattern coverage at 3.5 GHz NR band n78 with DL 4×4 MIMO operation around the device in the horizontal plane. The antenna implementation has the capability to point to the direction of the best received RF signals for concurrent antenna beams.

Figure 6:
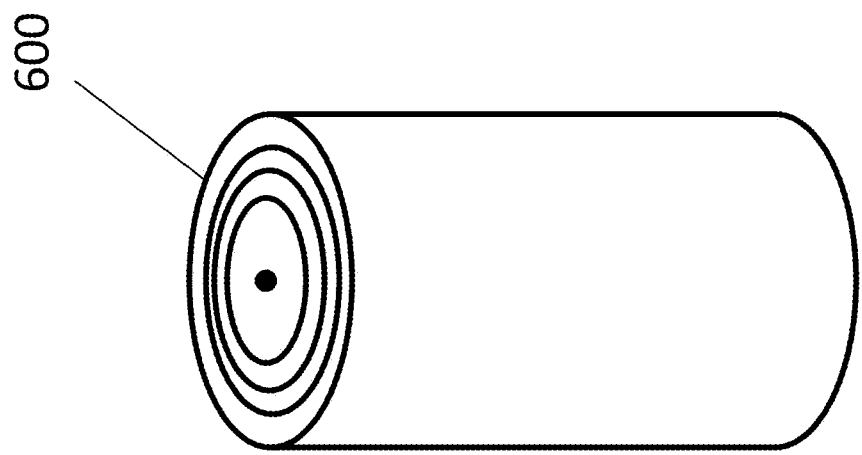
FIG. 6 shows a schematic diagram of a Fixed Wireless Access Computer Premises Equipment (FWA CPE)
Figure 7B:
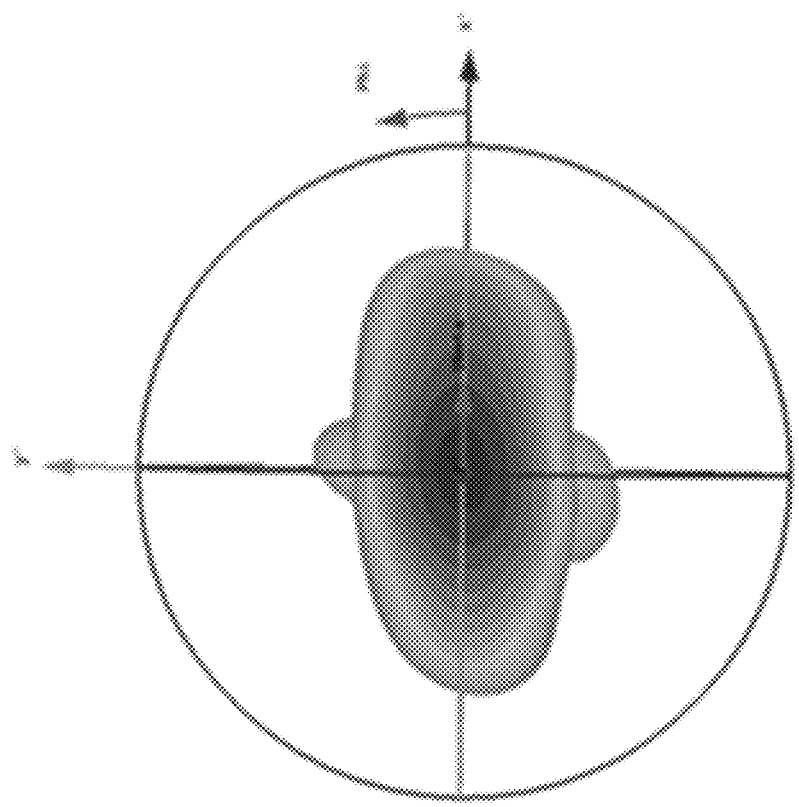
Figure 7A:
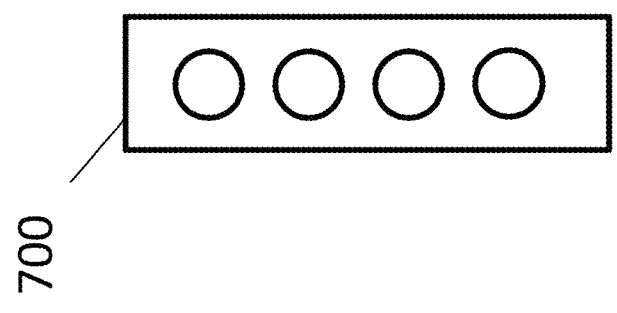
FIG. 7a shows a schematic diagram of an example 1×4 vertically stacked dual polarised microstrip antenna array.

The cylinder device appearance of a 5G FWA indoor CPE 600 is shown in FIG. 6. FIG. 7a illustrates the base of the antenna implementation which is a 1×4 vertically stacked dual polarized microstrip antenna array 700 for 3.5 GHz NR band. The radiation pattern of the antenna array 600 of FIG. 7a is shown in FIG. 7b. A single antenna array has ~11 dBi gain. The radiation pattern has a wider beam in the horizontal plane, for example, 70-90 degrees and a narrower beam in the vertical plane, for example, 20-30 degrees.

Figure 8B:
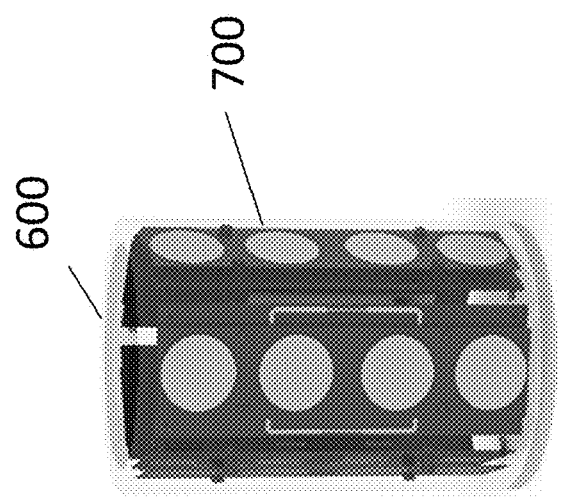
FIG. 8b shows a perspective view of an example antenna arrangement in the device of FIG. 6.
Figure 8A:
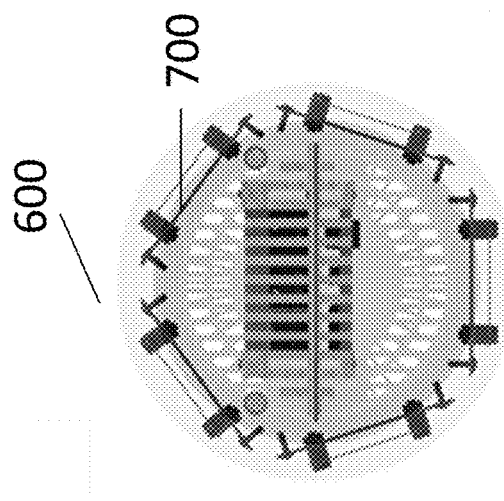
FIG. 8a shows a plan view of an example antenna arrangement in the device of FIG. 6.
Figure 9:
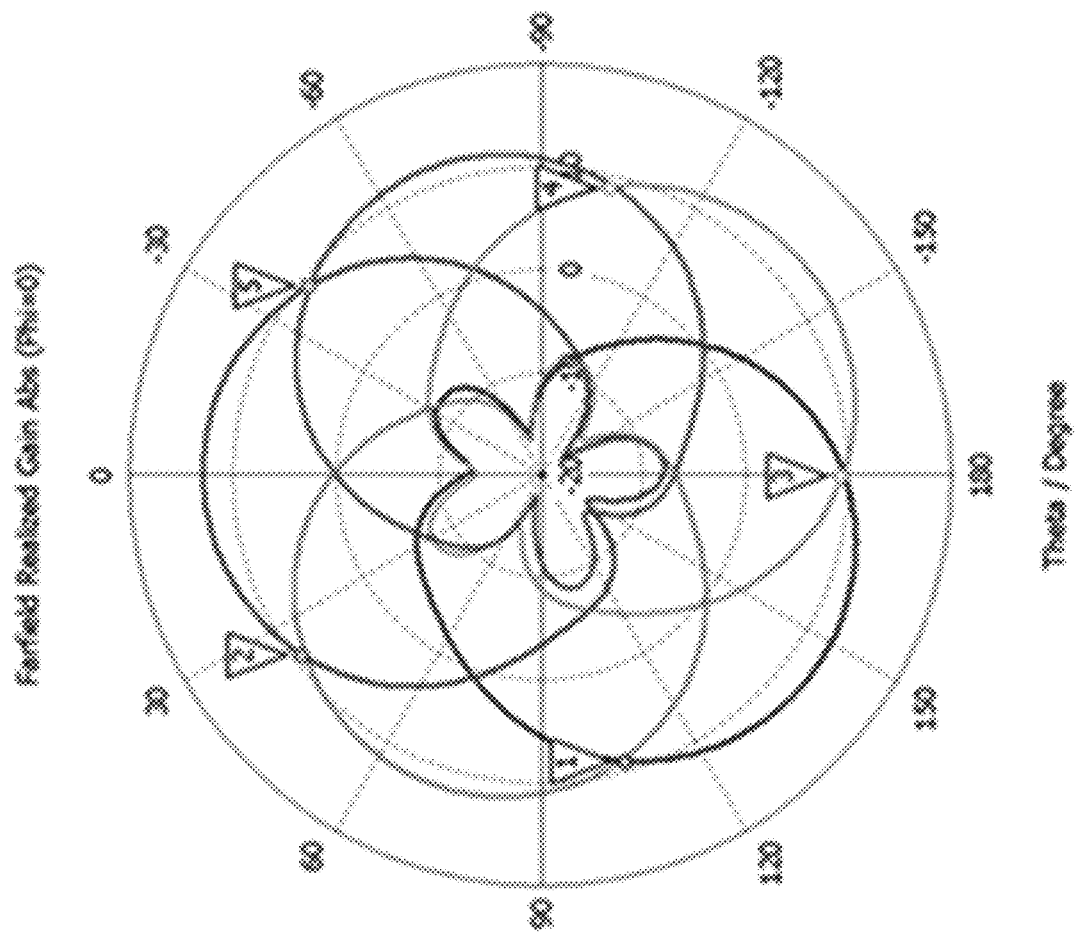
FIG. 9 shows an example radiation pattern of the antenna arrangement in FIGS. 8a and 8b.

An overall antenna arrangement inside the device 600 is shown in FIGS. 8a and 8b from a top view and side view, respectively. Five dual polarized antenna arrays 700 (10 antenna ports) are placed with equivalent angular spacing next to each other as illustrated. The antenna columns 700 are located around Printed Circuit Boards (PCB) and there is a heatsink located in the middle. These dual polarised antenna arrays 700 provide an overall horizontal plane radiation pattern around the FWA CPE device 600, which is shown in FIG. 9.

Figure 10:
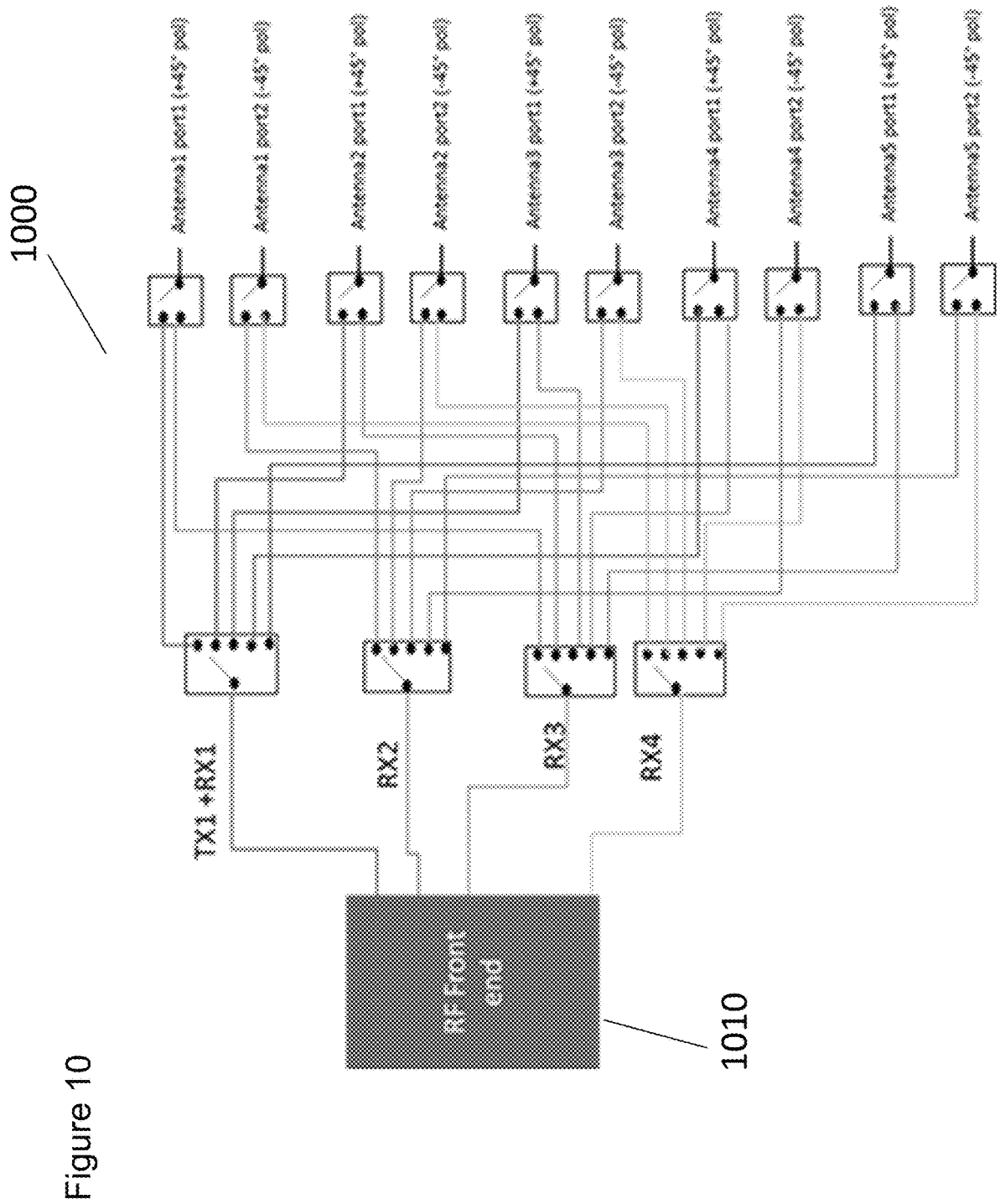
FIG. 10 shows a schematic diagram of a radio frequency (RF) switch matrix which may be used with the antenna arrangement of FIGS. 8a and 8b.

The system has a RF switch matrix 1000, shown in FIG. 10, which is used to transmit and receive RF signals from a modem RF front end 1010 to or from any of the five antenna array columns 700. The system is operated such that received RF signal strength and quality is measured using one dual polarized antenna array column 700 at a time. The two dual polarized antenna array columns 700 (DL 4×4 MIMO) providing the best received signal strength and quality are set for use at a time. This allows the FWA indoor CPE 600 to use high antenna gain independent from device orientation. The device also has omni-directional antennas (not shown in the figures) for low, mid, high LTE and NR bands (700-2700 MHz) and antennas for Wi-Fi.

Another example implementation of proprietary antenna selection is Transmit Antenna Switching (TAS) which commercial chipset vendors have implemented in the UE modem platforms. This feature has been used in portable UEs such as smartphones and is applicable for use in other type of device such as FWA CPE and vehicles.

Figure 11:
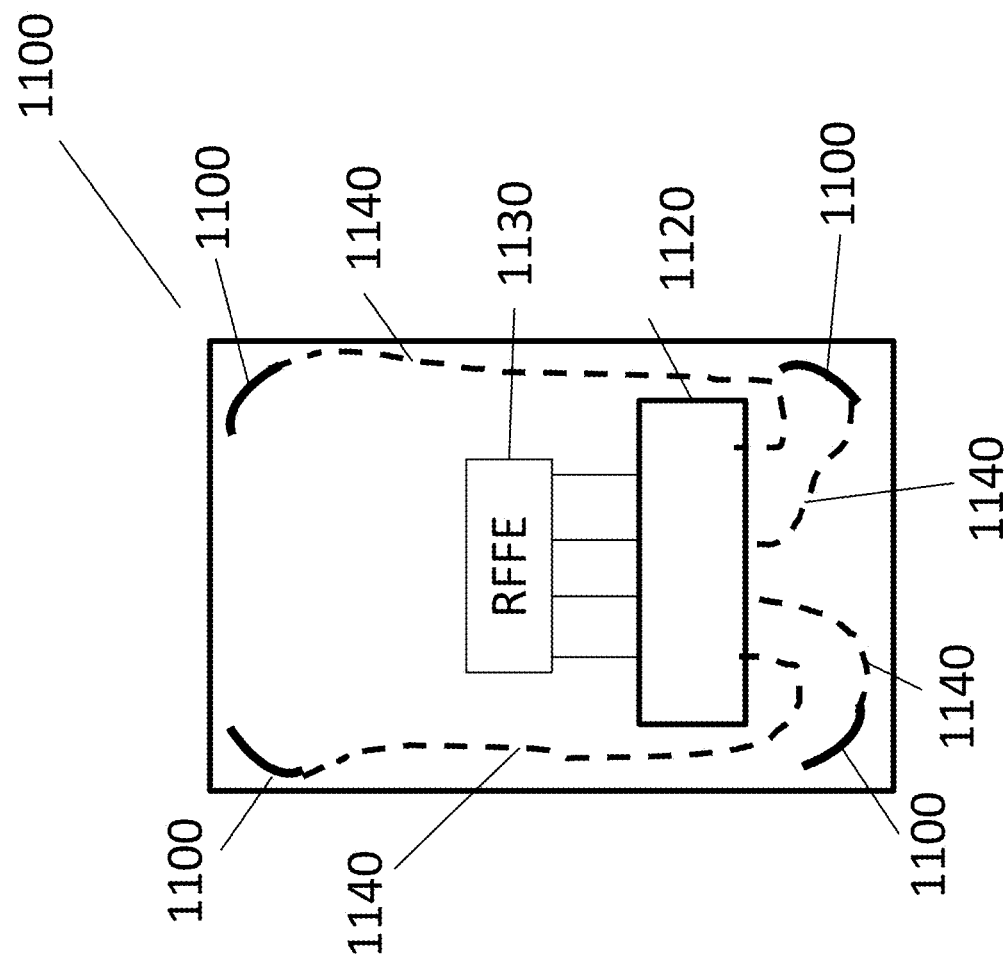
FIG. 11 shows a schematic diagram of antenna implementation in a user equipment.

In an example UE sub-6 GHz radio implementation involves an uplink (UL) SISO and downlink (DL) 4×4 MIMO/4 receiver. One antenna used for transmitting and receiving and 3 antennas are used for receiving only. An example hardware (HW) implementation for TAS is illustrated in FIG. 11. The UE 1100 illustrated in FIG. 11 has four antennas 1110 connected by RF transmission lines on printed circuit board of RF cables 1140 to a Four Pole Four Throw (4P4T) RF switch 1120 of equivalent RF switch arrangement between RF Front End (RFFE) 1130 and the antennas. The purpose is to enable switching the one transmit (TX) RF signal to any of the four antennas 1110. TAS has software (SW) implementation and algorithm implemented by the commercial chipset vendor. The system switches the TX RF signal dynamically to one of the four antennas 1110 providing the best UL performance based on the algorithm and signal strength and quality measurements made one at a time for all four antennas 1110.

Per the 3GPP definition, a UE can be in Radio Resource Control (RRC) connected mode (referred to as connected mode) or in RRC idle mode (referred to as idle mode). In idle mode, the UE is powered on, performs signal strength and quality measurements from RAN but has not yet attached to the network for a first time. Idle mode may also be understood as RRC in-active mode where a device has attached to a network but there is no data traffic/activity for a period and the device is set to in-active/sleep mode. In connected mode, a UE has an active connection to the network.

In proprietary (non-3GPP standard) implementations, antenna selection is currently done in connected mode where a UE has attached to a network, and to a certain cell in the network. When a UE is powered on, the device attaches to the network using the default set antenna configuration and using 3GPP defined procedures. The default antenna configuration may not be optimal for the particular use scenario. This may lead to radio link failures which interrupts and delays the antenna selection procedure. In addition, the UE may make inter-RAT, inter-cell or inter-band handovers during the antenna selection procedure which invalidates the successful antenna selection.

Figure 12:
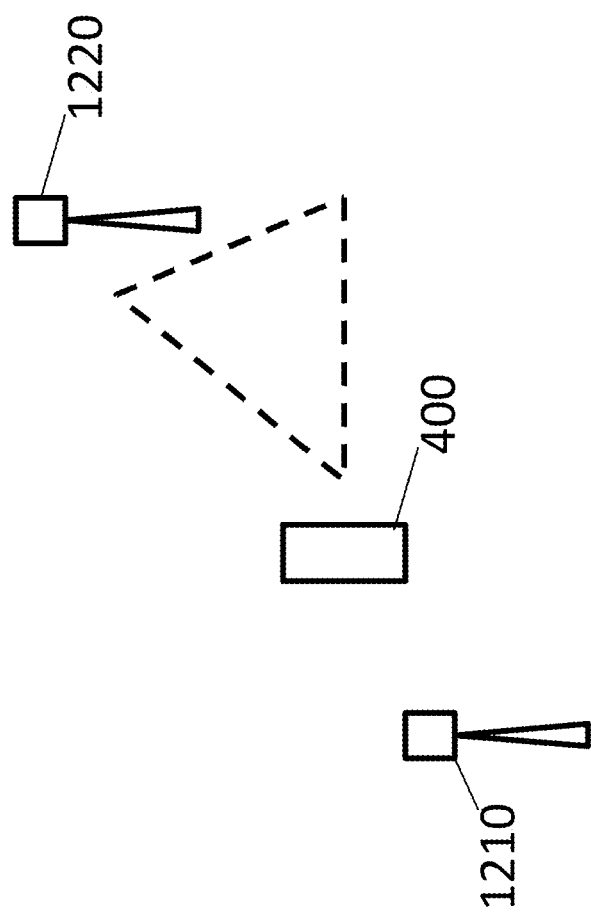
FIG. 12 shows a schematic diagram of an example user equipment and its radiation pattern in a scenario with two cells.

FIG. 12 illustrates an example where a UE 400 attaches to a network using an antenna configuration which has a radiation pattern (indicated by the dashed line) facing to cell 2 1220. Cell 2 1220 is further away from the UE than cell 1 1210. Cell 1 1210 would be signal strength and quality wise at a more optimal distance to UE 400 but is located in a non-optimal direction vs. the radiation pattern of the initial antenna configuration. In this case, UE attaches to cell 2 1220 and makes the antenna selection-based on signal strength and quality measurements from cell 2 1220.

Antenna selection procedures are in general intended to be fast so that they don't allow cell, RAT and band handovers during the operation to avoid handovers, for example, from priority bands (often for example n78 with 100 MHz spectrum) to low/mid band with (<20 MHz spectrum) or handovers from 5G to 4G or from 4G to 3G etc. However, there is case sensitive uncertainty on whether the system does handovers during the antenna selection or not which may be difficult to address in this example.

Figure 13:
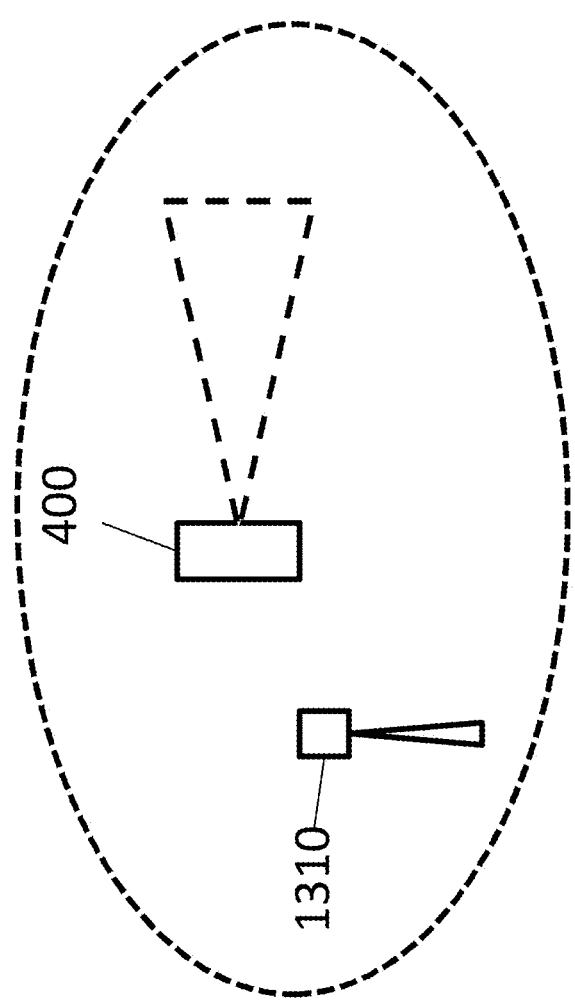
FIG. 13 shows a schematic diagram of an example user equipment and its radiation pattern in a scenario with co-located ultrahigh band and low band cells.

FIG. 13 illustrates an example where there are co-located ultrahigh band (3.5/4.8 GHz band) and low band (<1 GHz) cells at base station 1310. Here, the initial antenna configuration has a radiation pattern indicated by the dashed line (or device orientation) which doesn't find the radio signal with priority band (here n78, 3.5 GHz), causing radio link failure. After recovering from failure, the device attaches to network using for example, low band (<1 GHz) which has different, for example, more omni-directional radiation pattern and implements the antenna selection procedure accordingly for the low band.

Figure 14:
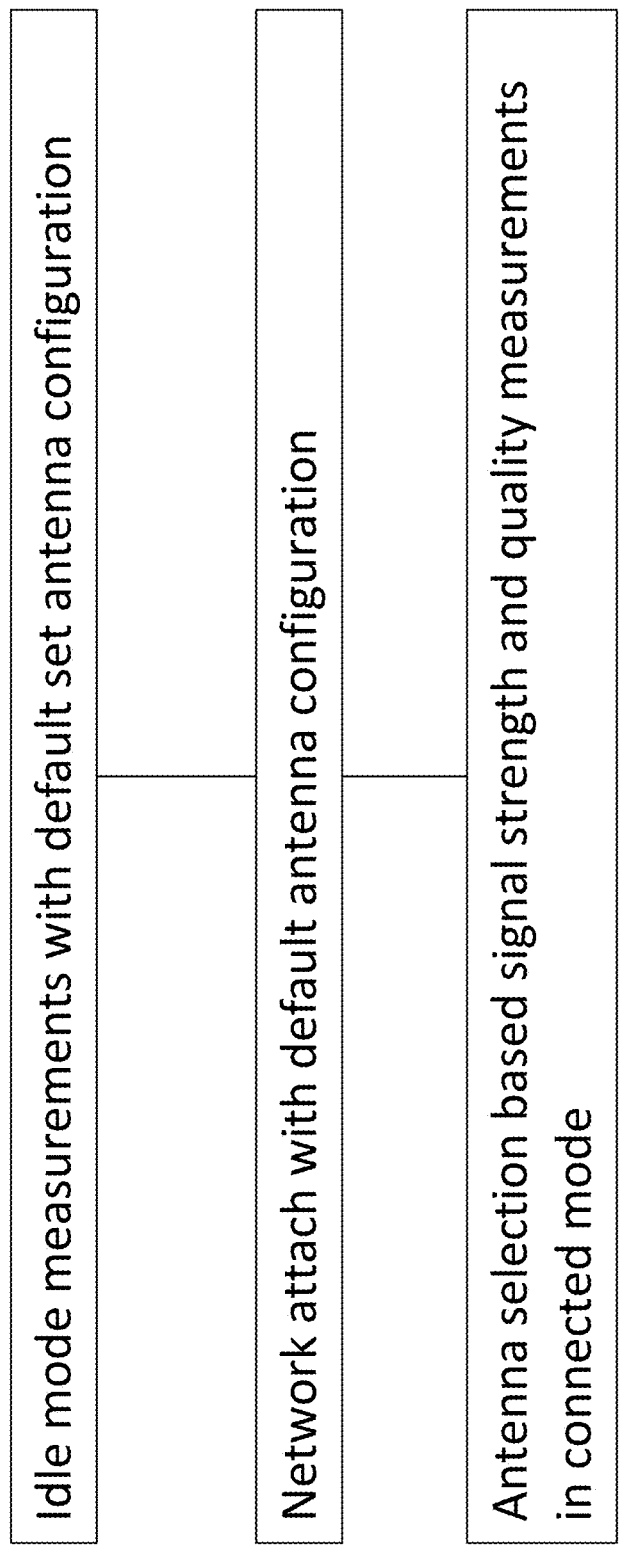
FIG. 14 shows a flowchart of an antenna selection method.

FIG. 14 shows a flowchart of a method of performing antenna selection in connected mode. Measurements are performed in idle mode with a default set antenna configuration. The UE performs the network attach procedure with the default antenna configuration. Antenna selection based signal strength and quality measurements are then performed in connected mode.

The following relates to selecting a UE antenna or antenna configuration for radio performance and end-user use.

This issue may be applicable to FWA CPEs and to any 3GPP access UEs. A characteristic feature of FWA indoor CPEs, portable UEs and vehicular UEs is they are intended for use in multiple device orientations and there are often not means to quantify what initial antenna configuration should be used for an initial attach procedure before running the antenna selection procedures.

Figure 15:
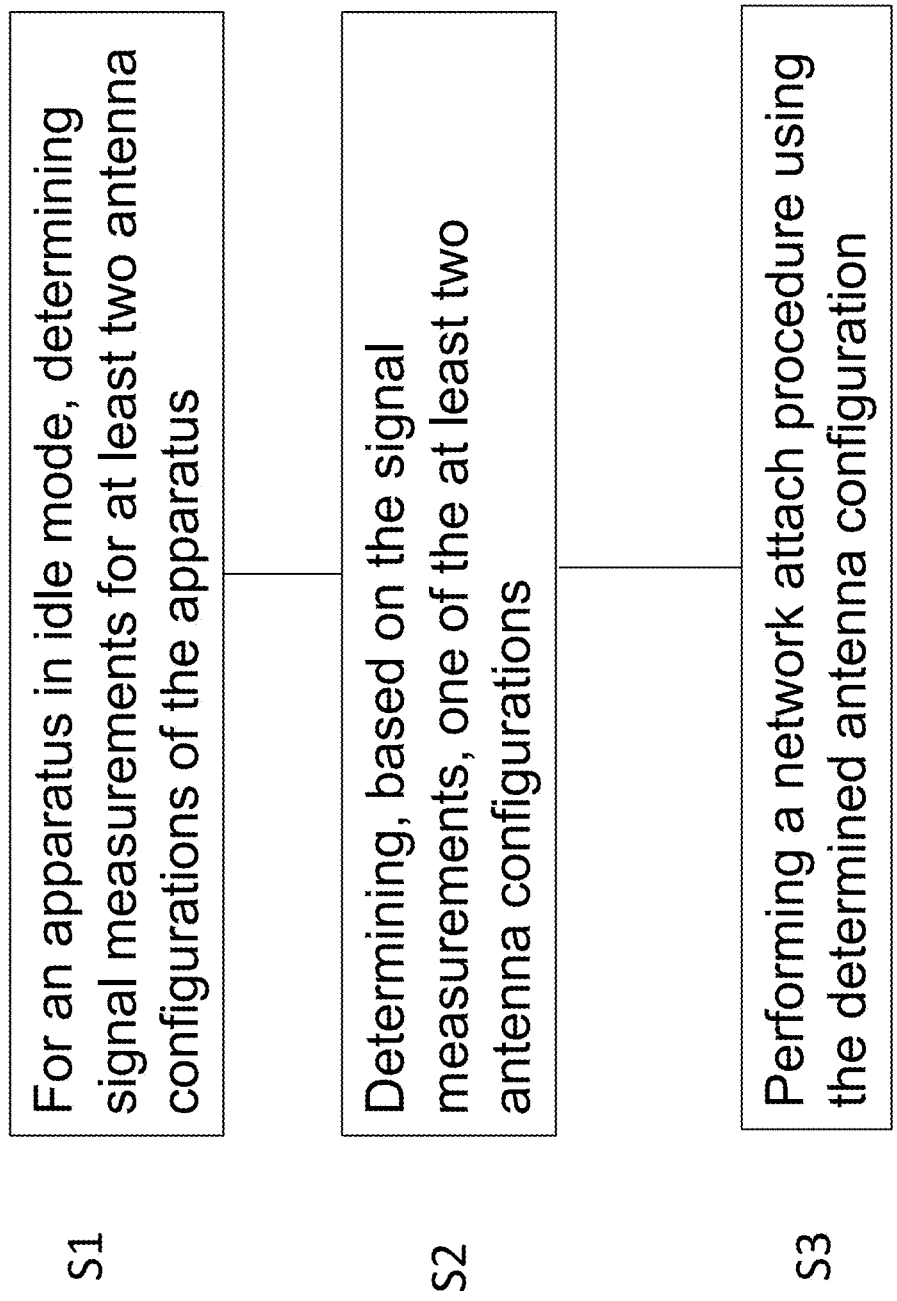
FIG. 15 shows a flowchart of a method according to an example embodiment.

FIG. 15 shows a flowchart of a method according to an example embodiment. The method may be performed at a UE such as, but not limited to, FWA indoor CPEs, portable UEs and vehicular UEs.

In S1 the method comprises, for an apparatus in idle mode, determining signal measurements for at least two antenna configurations of the apparatus.

In S2 the method comprises, determining, based on the signal measurements, one of the at least two antenna configurations.

In S3 the method comprises performing a network attach procedure using the determined antenna configuration.

Signal measurements may include signal strength and signal quality measurements. Signal strength and signal quality measurement parameters may include, but are not limited to, Reference Signal Received Power (RSRP), Reference Signal Received Quality (RSRQ), Modulation and Coding Scheme (MCS), MIMO rank, Signal-to-Noise Ratio (SNR), Signal-to-Interference-plus-Noise Ratio) SINR, Received Signal Strength Indicator (RSSI), Synchronizational Reference Signal Received Power (SSRSRP), Synchronization Signal Reference Signal ed Quality (SSRSRQ), Synchronisation Signal Signal-to-Interference-plus-Noise Ratio (SSSINR), Channel State Information Reference Signal Reference Power (CSI-RSRP), NR carrier Received Signal Strength Indicator (NR-RSSI), Channel State Information Reference Signal Reference Quality (CSI-RSRQ) or the like.

The method may comprise holding the apparatus in idle mode while the antenna configuration is determined. In this context, "holding" means that the apparatus remains in its current mode. Holding the apparatus in idle mode may comprise stopping, holding (in other words pausing) or delaying a network attach procedure.

The method may be performed on initial device activation or after a given time period.

Figure 16:
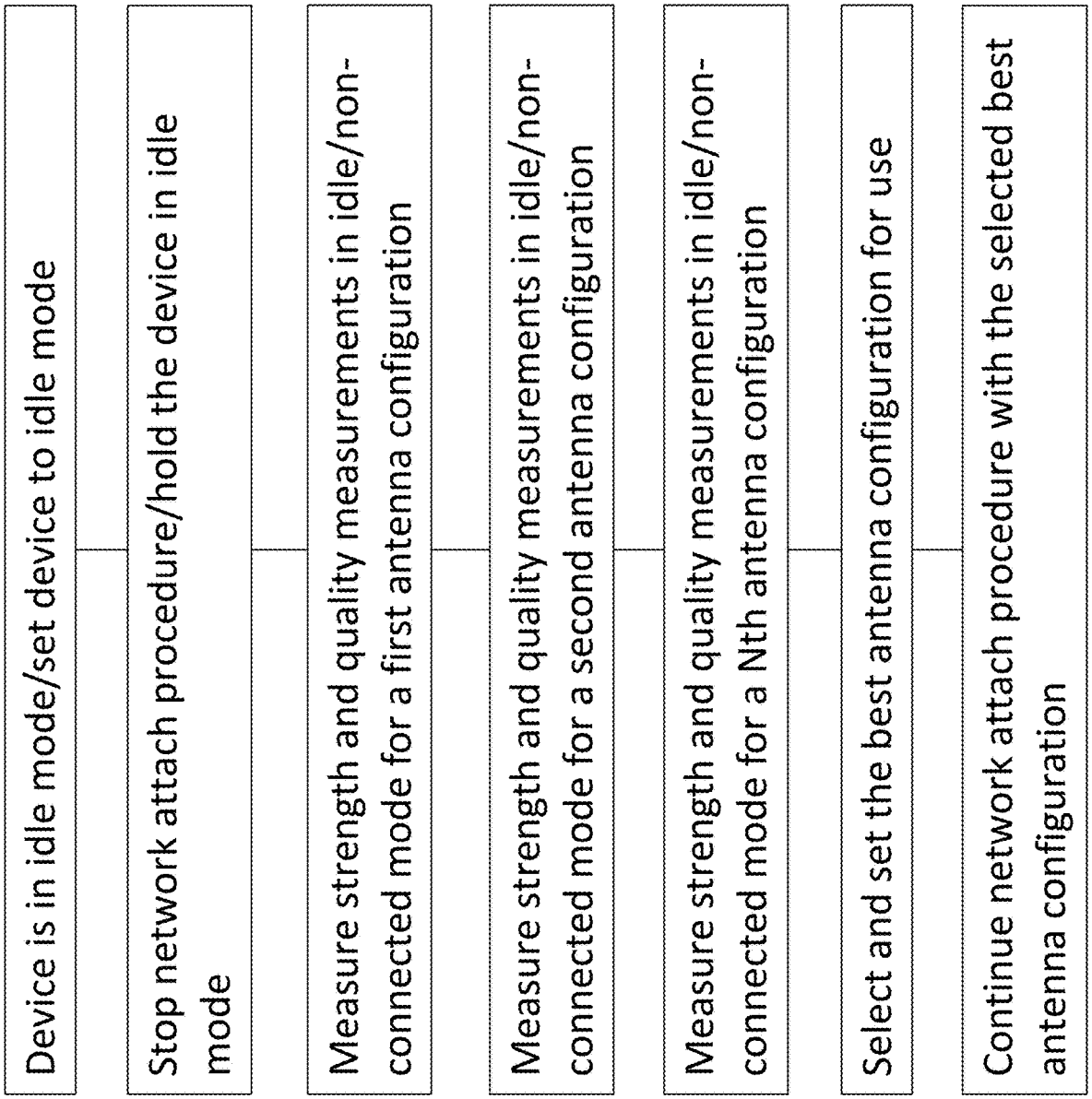
FIG. 16 shows a flowchart of an implementation of a method according to an example embodiment.

FIG. 16 shows a flow chart of an example method which may be implemented at a device. Initially, the device is in idle mode or is set to idle mode. Subsequently, any network attach procedure is stopped or held and the device is held in idle mode. Signal strength and quality measurements are then performed in idle mode for a first antenna configuration. Subsequently, signal strength and quality measurements are performed in idle mode for a second (and optionally Nth) antenna configuration). In some example embodiments, a maximum of two antenna configurations may be measured. The best antenna configuration is then selected for use, based on the signal strength and quality measurements performed for the first to Nth antenna configurations. The network attach procedure is then performed using the selected best antenna configuration.

The procedure for defining the best antenna configuration to attach to the network may also be based on preference/priority information for RAT, band or cell which is described next in greater detail. The preference/priority information may be stored on an apparatus.

The method may comprise determining the signal measurements for the at least two antenna configurations for at least one first radio access technology while at least one second radio access technology is disabled. The signal measurements for the at least two antenna configurations may be determined while one RAT of at least two RATs is enabled and the other of the at least two RATs are disabled. The at least one first radio access technology may be determined based on radio access technology priority information.

RAT priority information may indicate which RATs are measured for antenna selection and in which order. RAT priority information may be pre-defined. The order may be either device specific or customer/operation specific.

Figure 17:
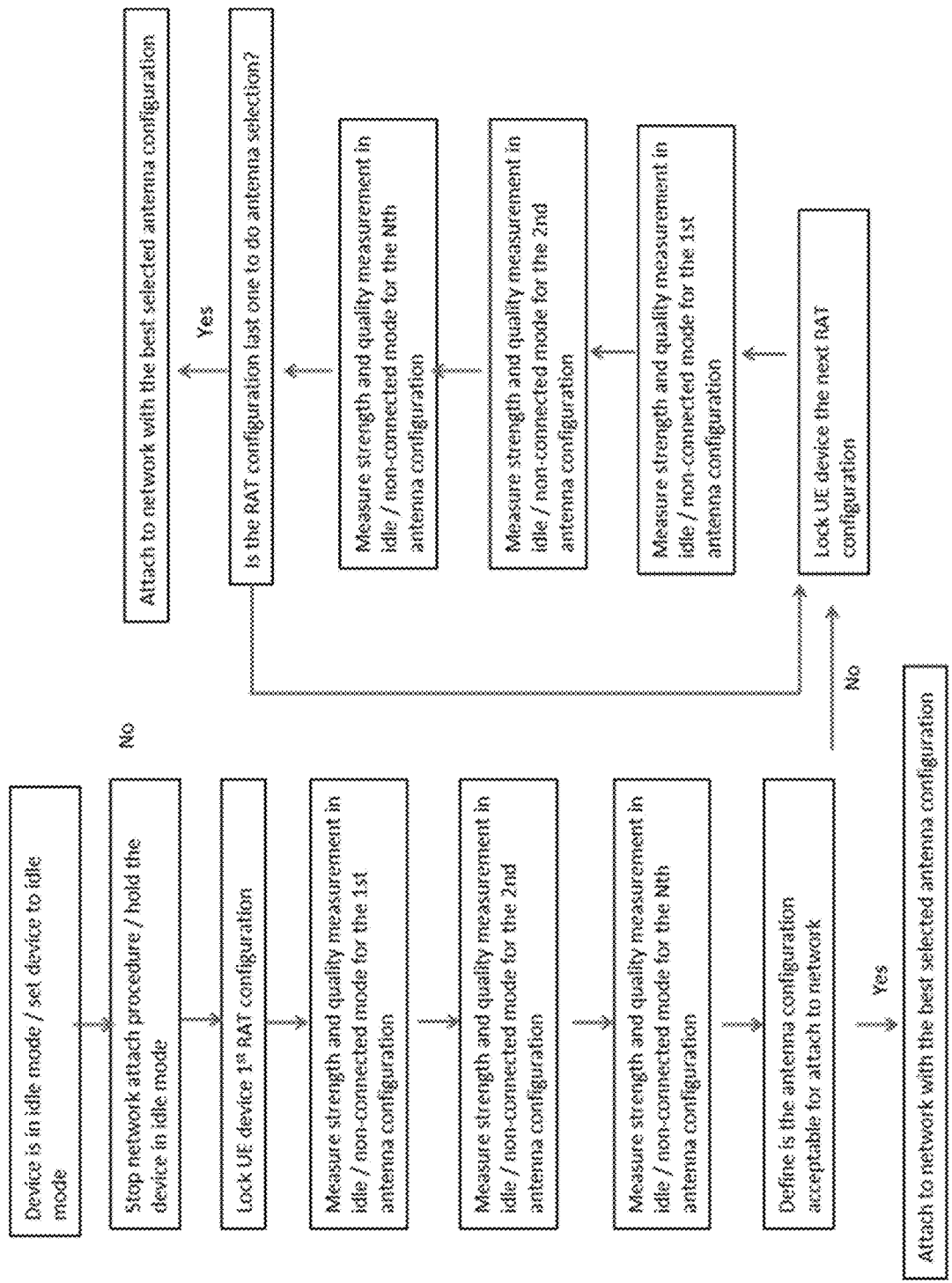
FIG. 17 shows a flowchart of an implementation of a method according to an example embodiment.

FIG. 17 shows a flow chart of a method which may be implemented at an apparatus such as a UE. The flow chart of FIG. 17 is based on that of FIG. 16 and includes locking the device to one RAT at a time and performing signal strength and quality measurements for a first to Nth antenna configuration locked to that RAT. Locking in this context means enabling one RAT at a time in the UE whilst temporarily disabling other RATs.

Subsequently, it is determined whether, based on the signal measurements, an antenna configuration is acceptable. If so, a network attach procedure using the determined antenna configuration is performed. If not, the UE locks to the next RAT configuration and performs signal measurements for first to Nth antenna configurations locked to that RAT.

In the example shown in FIG. 17, an antenna selection scan (in other words, signal measurements for antenna configurations) is run for one RAT at a time. Determining if the antenna configuration is acceptable for performing a network attach procedure may be based on a condition such as a pre-defined signal strength and quality criteria within a RAT. Alternatively, a condition may be determining signal measurements for all RATs and defining the best antenna configuration once signal measurements have been determined for the at least two antenna configurations for all RATs.

Figure 18C:
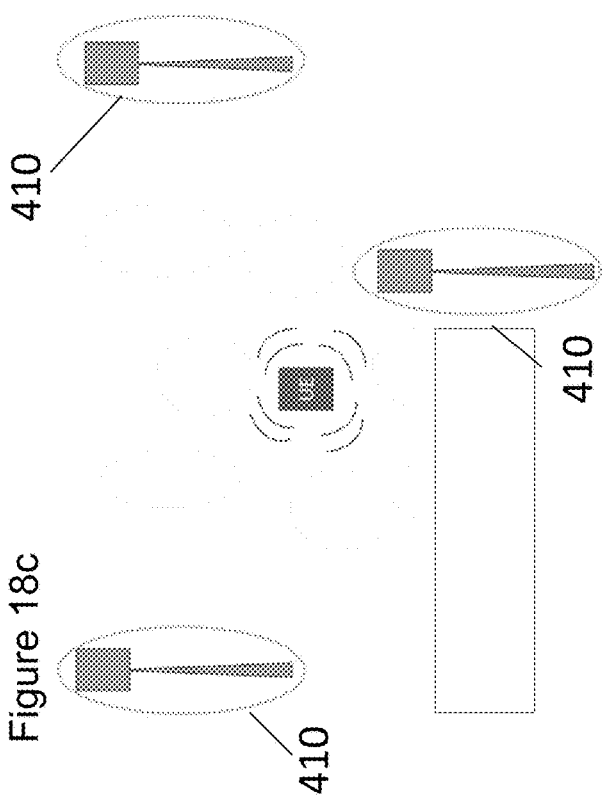
FIG. 18c shows a schematic diagram of an example UE locked to a third RAT.
Figure 18A:
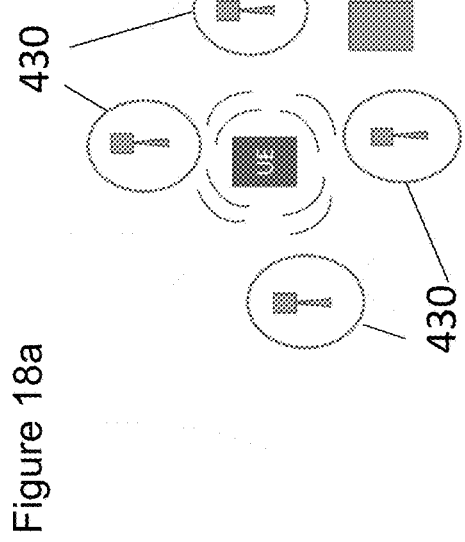
FIG. 18a shows a schematic diagram of an example UE locked to a first RAT.
Figure 18B:
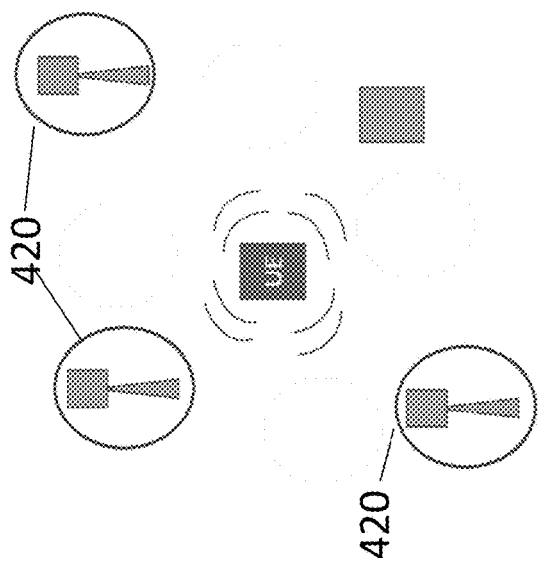
FIG. 18b shows a schematic diagram of an example UE locked to a second RAT.

Visualization of this example procedure is provided in FIGS. 18a)-18c). In this example scenario, the UE is in a communications system as illustrated in FIG. 4. As an example, pico/femto cells 430 represents upper mm-wave frequency/THz RAT, small cells 420 represent lower mm-wave frequency (FR2) RAT and macro cell 410 represent sub-6 GHz RAT. The antenna selection signal strength and quality measurement cycle is started from the highest frequency RAT, which also means the most localized network. Locking the UE to the first RAT is illustrated in FIG. 18a) and locking the UE to the second and the third RAT based on pre-defined priority order are illustrated in FIGS. 18b) and 18c), respectively. Quantification of the third "sub-6 GHz RAT" may include sub-division to NR FR1, LTE, 3G and 2G RATs which for the sake of simplicity is not presented in the figures and in the description.

Locking the device to one RAT at a time may avoid RAT reselection/handovers which complicates the antenna selection and/or might lead errors in selecting the best antenna configuration.

The method may comprise determining the signal measurements for the at least two antenna configurations for at least one first band while measurements for at least one second band are disabled. The at least one first band may be determined based on band priority information.

Band priority information may indicate which bands are measured for antenna selection and in which order. Band priority information may be pre-defined. The order may be either device specific or customer/operation specific. Band priority information may be included in the antenna selection procedure. Antenna selection procedure may be made faster by pre-defining/pre-screening the bands for priority which are measured.

Figure 19:
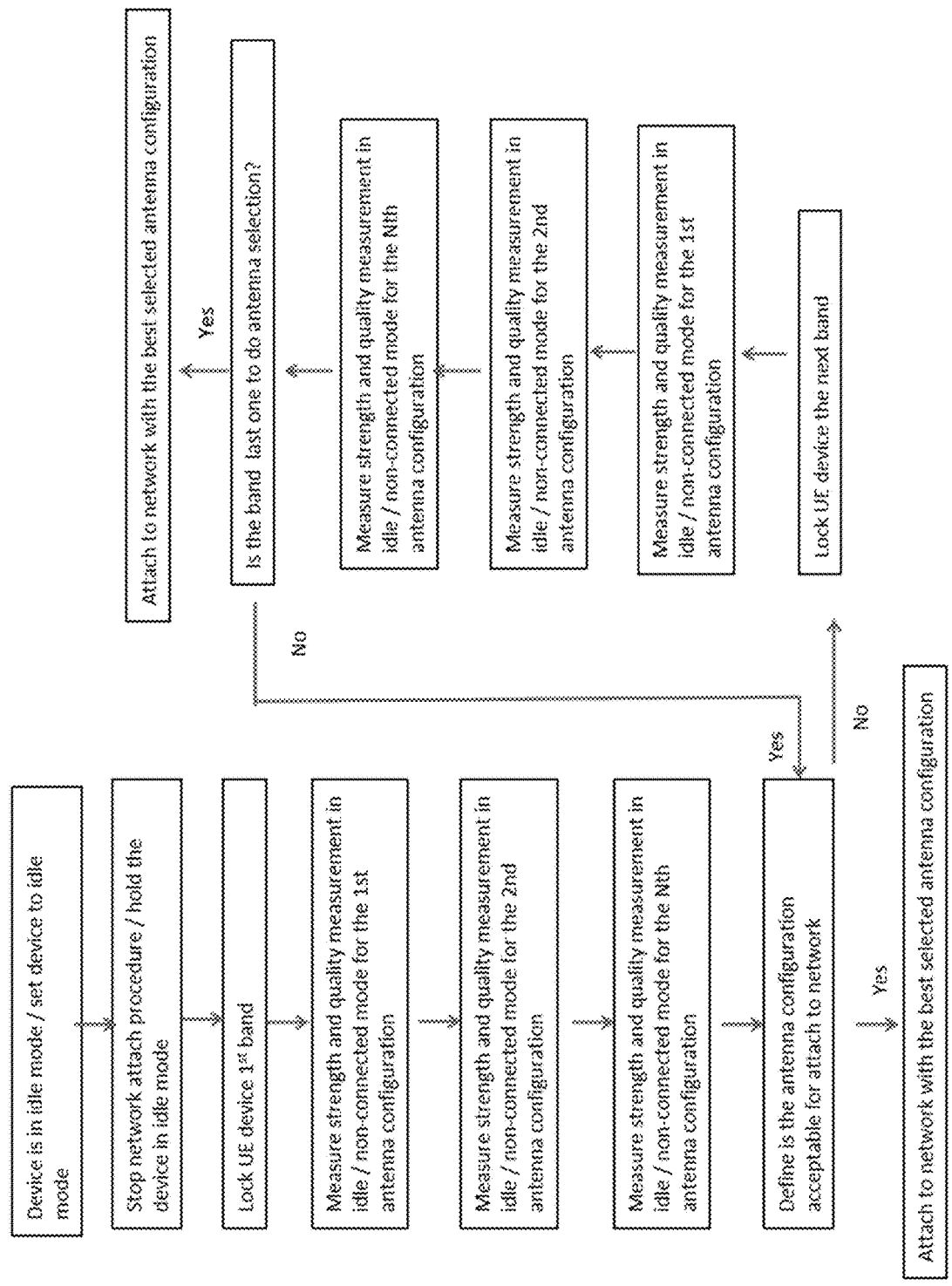
FIG. 19 shows a flowchart of an implementation of a method according to an example embodiment.

FIG. 19 shows a flowchart of a method according to an example embodiment where a device is locked to one band at a time. Locking in this context allows a UE to measure one band at a time while the capability to measure the other bands is temporarily disabled. The procedure of FIG. 19 is analogous to the procedure in FIG. 17 with the exception that, instead of RAT, the device is locked to a band.

The band lock allows a UE to measure more than one cell in the band and to do handovers between cells which are in the same band. However, it doesn't allow inter band handovers.

FIG. 20a) shows the deployment model of FIG. 4, illustrating all cells at all bands around the UE FIG. 20b illustrates an example where a device is locked to band A.

Locking a UE to one band at a time prevents system inter-band handovers during the antenna selection procedure.

The method may comprise determining the signal measurements for the at least two antenna configurations for at least one first cell while measurements for at least one second cell are disabled. The signal measurements for at least two antenna configurations may be determined while one cell of the at least two cells is enabled and the other of the at least two cells are disabled.

Figure 21:
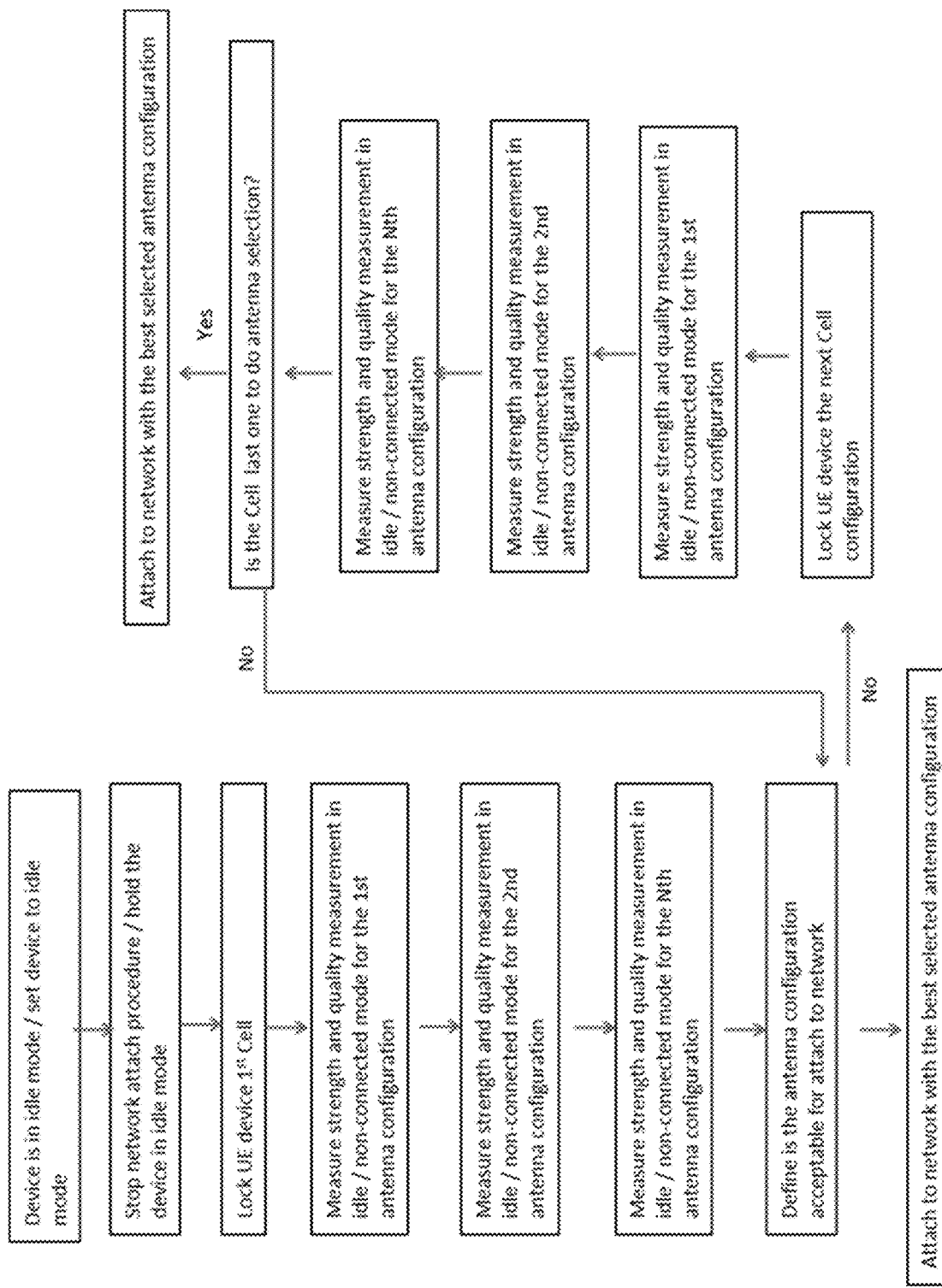
FIG. 21 shows a flowchart of an implementation of a method according to an example embodiment.

FIG. 21 shows a flowchart of a method according to an example embodiment where a device is locked to one cell at a time. Locking in this context means that a device can measure only one cell at a time. The capability to measure and to do handovers to other cells is temporarily disabled. The procedure of FIG. 21 is analogous to that of FIGS. 17 and 19 with the exception that instead of RAT, or band, the device is locked to a cell.

The at least one first cell may be determined based on cell priority information. Cell priority information may indicate which cells are measured for antenna selection and in which order. The determination of which cell is measured may be pre-defined. It may also be based on available/UE visible cells defined by measurements which occur before the antenna selection procedure is started (not illustrated in flow diagram).

FIG. 22a shows the RAN deployment model of FIG. 4 illustrating each cell. FIG. 22b shows an example illustration of a cell lock mechanism, in other words, making only one cell (Cel1) of all cells available for measurement and antenna selection.

Using a method as described with reference to FIGS. 21 and 22, cell handovers may be prevented. Antenna selection operation may include information of cell priority and the selection procedure may be made faster by pre-defining/pre-screening the cells which are measured for the antenna selection.

Any of the described antenna selection procedures where the apparatus is locked to a RAT, band or cell may be applied in connected mode where a device has attached to network. That is, a method may comprise, when the apparatus is in connected mode, determining signal measurements for at least two antenna configurations, determining, based on the signal measurements, one of the at least two antenna configurations and using the determined antenna configuration for transmission. The antenna selection procedures in connected mode are the same as provided for idle/non-connected mode antenna selection except that the device attaches first to the network with a pre-defined/default antenna configuration and starts an antenna selection procedure after that. In connected mode, once the antenna configuration has been determined, the apparatus uses the determined antenna configuration for at least one of transmission and reception.

In connected mode, the method may be performed after a given time period or based on a signal measurement threshold. For example, performance of the method may be triggered by signal strength and/or quality meeting a pre-defined threshold. The threshold may be one at which Radio Link Failure (RLF) could occur.

The above described idle and connected mode antenna selection schemes may be used in mixed mode.

For example, in use a FWA is a static device and so the FWA antenna selection procedures do not need to run as frequently as for a portable UE, for example and not limited to, a smartphone, operating in more dynamic use environments. In the FWA use case, the antenna selection procedure may be performed in idle mode in an initial attach phase when the device is first time powered on and/or after a time interval for routine periodic/refresh antenna selection (which may be scarce because of the static use case). Antenna selection may be performed at periods when a device has been in idle mode for a longer time. Connected mode antenna selection may be run in "emergency cases" such as radio link failure where for example, the device experiences sudden signal strength and/or quality drop.

For a portable/mobile UE the emphasis and weighting of connected mode and idle mode antenna selections may be different. For example, the antenna selection procedure in idle mode may be used for an initial attach procedure. The time interval for routine periodic/refresh antenna selection in this case is more frequent because of the dynamic use case. Antenna selection is done regardless of whether the device is in connected or idle mode and whether the antenna selection procedure is performed in idle or in connected mode is determined dynamically. Antenna selection is performed in idle mode when the device is in idle mode otherwise the antenna selection is done in connected mode.

An apparatus may comprise means for, when the apparatus is in idle mode, determining signal measurements for at least two antenna configurations of the apparatus, determining, based on the signal measurements, one of the at least two antenna configurations and performing a network attach procedure using the determined antenna configuration.

An electronics communication device may comprise an apparatus comprising means for when the apparatus is in idle mode, determining signal measurements for at least two antenna configurations of the apparatus, determining, based on the signal measurements, one of the at least two antenna configurations and performing a network attach procedure using the determined antenna configuration.

An electronic communications device may comprise at least one of a UE, CPE and vehicle or the like. A UE device may comprise at least one of a smartphone, cell phone, laptop, tablet, smartwatch, medical device and audio/video device or the like. A vehicle may comprise at least one of a wheeled vehicle, for example, and not limited to, a car, truck or motorcycle, a waterborne vehicle and an airborne vehicle, for example and not limited to an aircraft or a drone/UAV.

The method may be implemented at a user equipment as described with reference to FIG. 2 or a device as described with reference to FIGS. 6 to 10.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
   at least one processor and at least one memory including program instructions, the at least one memory and program instructions configured to, with the at least one processor, cause the apparatus at least to:
   configure the apparatus to be in idle mode, and in said idle mode perform the following:
   determine signal measurements for at least two antenna configurations of the apparatus;
   determine, based on the signal measurements, one of the at least two antenna configurations; and
   perform a network attach procedure using the determined antenna configuration.

2. An apparatus according to claim 1, wherein the apparatus is further configured to hold the apparatus in idle mode while the antenna configuration is determined.

3. An apparatus according to claim 1, wherein the apparatus is further configured to, on initial activation of the apparatus or after a given time period,
   determine signal measurements for at least two antenna configurations;
   determine, based on the signal measurements, one of the at least two antenna configurations; and
   perform the network attach procedure using the determined antenna configuration.

4. An apparatus according to claim 1, wherein the apparatus is further configured to be in connected mode, and
   determine signal measurements for at least two antenna configurations;
   determine, based on the signal measurements, one of the at least two antenna configurations; and
   use the determined antenna configuration for at least one of transmission or reception.

5. An apparatus according to claim 4, wherein the apparatus is further configured to, after a given time period or based on a signal measurement threshold,
   determine signal measurements for the at least two antenna configurations;
   determine, based on the signal measurements, one of the at least two antenna configurations; and
   use the determined antenna configuration for at least one of transmission or reception.

6. An apparatus according to claim 1, wherein the apparatus is further configured to determine the signal measurements for the at least two antenna configurations for at least one first radio access technology while at least one second radio access technology is disabled.

7. An apparatus according to claim 6, wherein the apparatus is further configured to determine the at least one first radio access technology based on radio access technology priority information.

8. An apparatus according to claim 1, wherein the apparatus is further configured to determine the signal measurements for the at least two antenna configurations for at least one first band while measurements for at least one second band are disabled.

9. An apparatus according to claim 8, wherein the apparatus is further configured to determine the at least one first band based on band priority information.

10. An apparatus according to claim 1, wherein the apparatus is further configured to determine the signal measurements for the at least two antenna configurations for at least one first cell while measurements for at least one second cell are disabled.

11. An apparatus according to claim 10, wherein the apparatus is further configured to determine the at least one first cell based on cell priority information.

12. An apparatus according to claim 1, wherein the signal measurements comprise at least one of signal strength or signal quality.

13. A method comprising:
    determining, by an apparatus in idle mode, signal measurements for at least two antenna configurations of the apparatus;
    determining, by the apparatus in idle mode, based on the signal measurements, one of the at least two antenna configurations; and
    performing, by the apparatus in idle mode, a network attach procedure using the determined antenna configuration.

14. A method according to claim 13, further comprising holding the apparatus in idle mode while the antenna configuration is determined.

15. A method according to claim 13, further comprising, on initial activation of the apparatus or after a given time period,
    determining signal measurements for at least two antenna configurations,
    determining, based on the signal measurements, one of the at least two antenna configurations, and
    performing the network attach procedure using the determined antenna configuration.

16. A method according to claim 13, further comprising, configuring the apparatus to be in connected mode,
    determining signal measurements for at least two antenna configurations,
    determining, based on the signal measurements, one of the at least two antenna configurations, and
    using the determined antenna configuration for at least one of transmission or reception.

17. A method according to claim 16, further comprising, after a given time period or based on a signal measurement threshold,
    determining signal measurements for the at least two antenna configurations,
    determining, based on the signal measurements, one of the at least two antenna configurations, and
    using the determined antenna configuration for at least one of transmission or reception.

18. A method according to claim 13, further comprising determining the signal measurements for the at least two antenna configurations for at least one first radio access technology while at least one second radio access technology is disabled.

19. A method according to claim 18, further comprising determining the at least one first radio access technology based on radio access technology priority information.

20. An electronics communication device comprising the apparatus of claim 1.

* * * * *